United States Patent [19]

Purcell

[11] 4,133,499
[45] Jan. 9, 1979

[54] FISHING REEL

[75] Inventor: William A. Purcell, Philadelphia, Pa.

[73] Assignee: Penn Fishing Tackle Mfg. Co., Philadelphia, Pa.

[21] Appl. No.: 861,206

[22] Filed: Dec. 16, 1977

[51] Int. Cl.² ............................................. A01K 89/00
[52] U.S. Cl. ............................... 242/217; 242/84.5 R
[58] Field of Search ............................. 242/213–219, 242/84.5, 211

[56] References Cited

U.S. PATENT DOCUMENTS

| | | | |
|---|---|---|---|
| 3,425,644 | 2/1969 | Griste | 242/213 |
| 3,432,114 | 3/1969 | Meisner | 242/219 |
| 3,997,130 | 12/1976 | Policansky | 242/217 X |
| 4,056,246 | 11/1977 | Purcell | 242/219 |

*Primary Examiner*—Leonard D. Christian
*Attorney, Agent, or Firm*—Zachary T. Wobensmith, 2nd; Zachary T. Wobensmith, III

[57] ABSTRACT

A fishing reel is disclosed having a spool supported on a shaft between spaced housings. One of the housings carries a shaft supporting bearing and a slidably mounted click. The other of the housings carries an operating handle and encloses a pressure plate for adjustable and controlled engagement with a friction drag washer on the spool. A knob for preset adjustment, and a brake control lever with frictionally controlled limited movement, for rapid control of the engagement and disengagement of the pressure plate and drag washer are provided, accessible on the outside of the other of the housings for free spooling or for placing a braking action on the spool.

9 Claims, 9 Drawing Figures

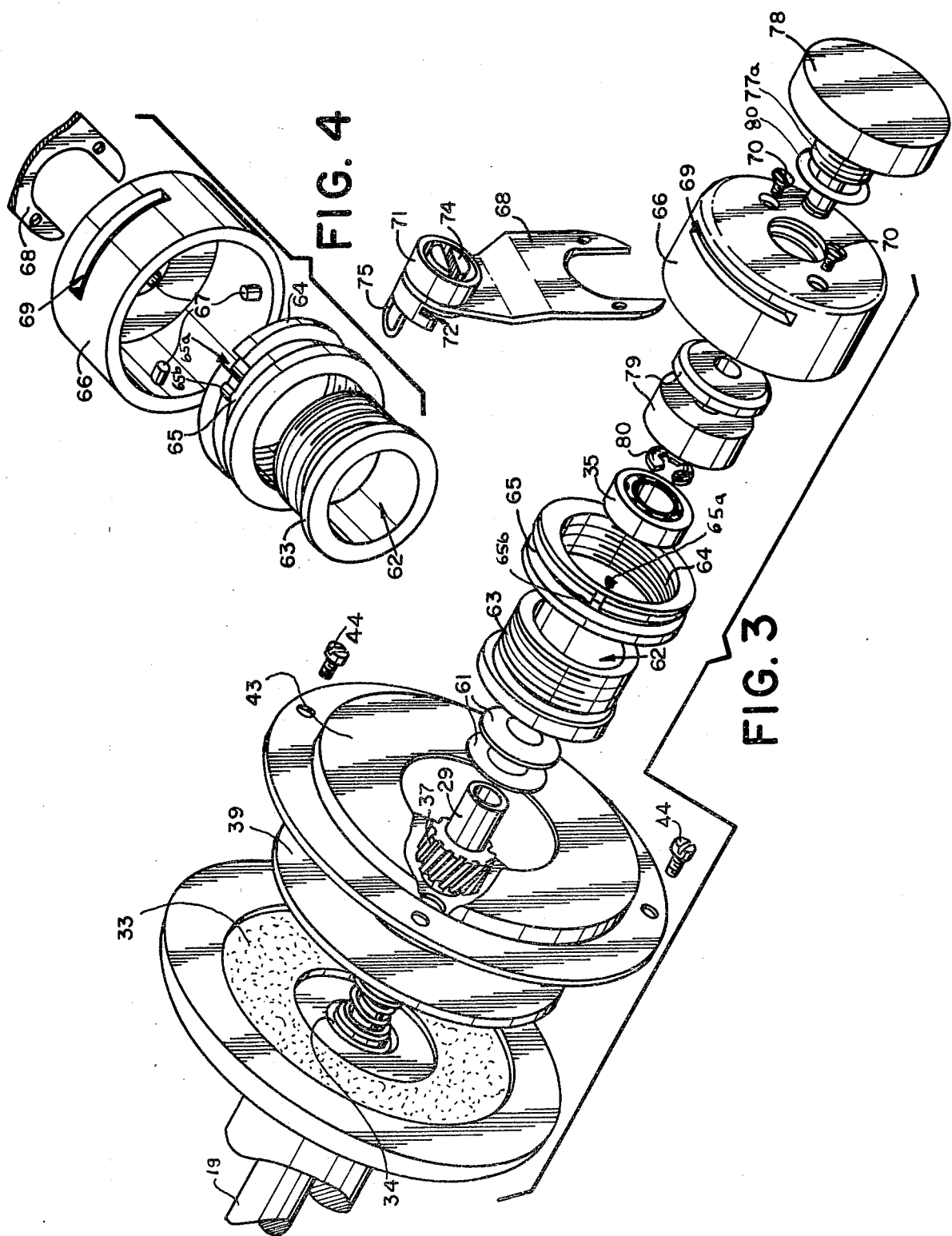

FISHING REEL

BACKGROUND OF THE INVENTION

1. Field of the Invention

This invention relates to fishing reels and more particularly to fishing reels with controlled friction drag.

2. Description of the Prior Art

It has heretofore been proposed as shown in the U.S. Pat. No. 3,425,644, to Griste, to provide a fishing reel with a manually operable brake control permitting free spooling and controlled braking. While the Griste reel has proven satisfactory, it is considered desirable from the viewpoint of construction and maintenance to locate the brake contiguous to its controls rather than to shift the spool for brake application.

In my prior U.S. Pat. No. 4,056,246, a reel is shown with controlled drag and which does not shift the spool for brake application. While my prior structure has proven to be satisfactory, it is desirable to more closely control the braking action and to provide easier access to the braking portion of the reel for maintenance, than is provided for in my prior patent.

SUMMARY OF THE INVENTION

In accordance with the invention, a fishing reel is provided which has free spooling or braking action with a knob whose movement is cam controlled for preset adjustment of the braking action, and a frictionally retarded brake control lever, with limited movement for control of the engagement and disengagement of an enclosed pressure plate with a drag washer carried on the spool, the braking mechanism being located contiguous to the controls and to the actuating handle for the spool.

It is an object of the invention to provide a fishing reel with positive adjustable control of brake application, with a predetermined location for free spool action, a predetermined and indicated range for brake control, and in which the control structure is readily accessible.

It is a further object of the invention to provide a fishing reel with a manually accessible brake control lever movable to a positive location for free spooling, and within a predetermined range for brake control.

It is an object of the invention to provide a fishing reel wherein the brake mechanism is protected from dirt but has easy access for maintenance as required.

It is a further object of the invention to provide a fishing reel of the character aforesaid which is rugged and free from operating difficulties.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part thereof, in which:

FIG. 3 is an exploded perspective view of a portion of the structure shown in FIG. 1;

FIG. 4 is an exploded fragmentary perspective view similiar to FIG. 3;

Figure 1:
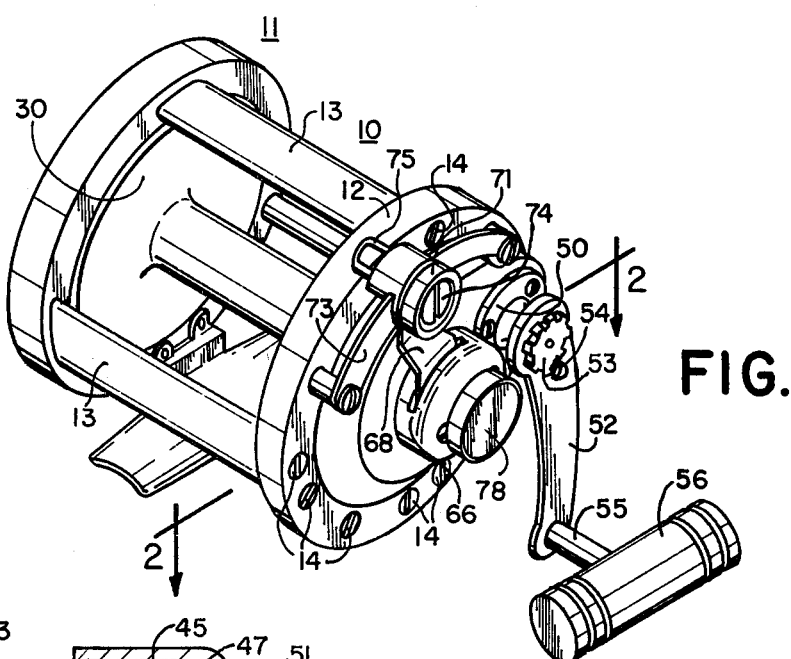
FIG. 1 is a view in perspective of a fishing reel in accordance with the invention.

It should, of course, be understood that the description and drawings herein are illustrative merely, and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings in which a preferred embodiment of the invention is illustrated a reel frame 10 is shown with side rings 11 and 12 connected by frame posts 13, screws 14, and with a reel stand 15 carried thereby. The side rings 11 and 12 have side housing plates 16 and 17 integral therewith.

Figure 6:
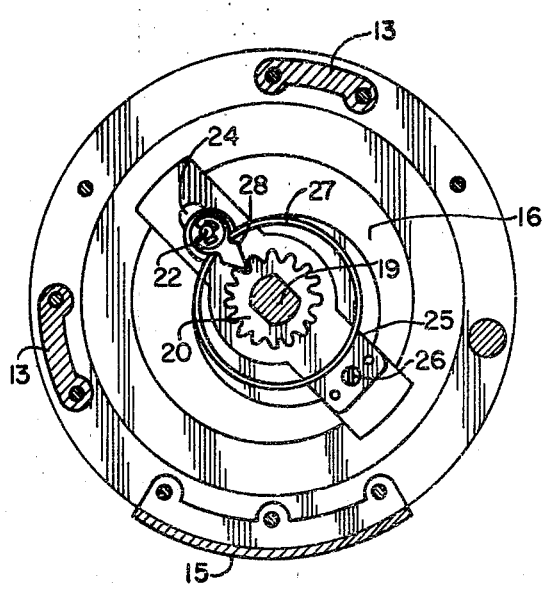
FIG. 6 is a vertical sectional view taken approximately on the line 6—6 of FIG. 5.
Figure 9:
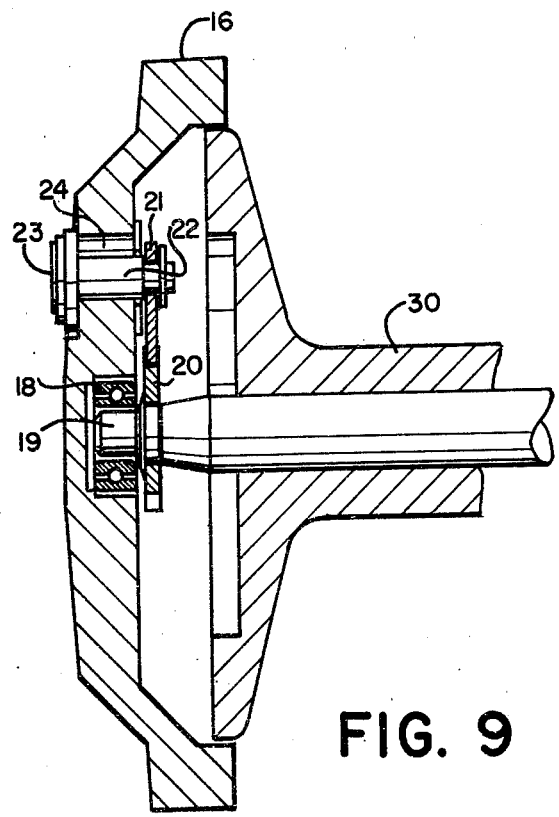
FIG. 9 is a horizontal sectional view taken approximately on the line 9—9 of FIG. 8.

The side housing plate 16 has a bearing 18 carried thereby which supports a spool shaft 19 at one end. The shaft 19 has a click gear 20 carried thereon. A click tongue 21 is provided (see FIGS. 6 and 9) mounted on a click shaft 22 with a click tongue positioning button 23 on the other end of the click shaft 22. The click shaft 22 is slidably carried in an elongated opening 24 in the side housing plate 16. A click spring 25 held in place on the interior of the housing plate 16 by a screw 26 has arcuate arms 27 which engage in opposite recesses 28 on the click tongue 21 when it is in the downward position and permit limited swinging movement of the click tongue 21 in either direction.

The ends of the arms 27 engage opposite faces of the click tongue 21 when it is in the upper out of action position (not shown) and prevent movement of the click tongue 21.

The shaft 19 has mounted thereon, between the housing plates 16 and 17, a spool 30 for the reception of the fishing line (not shown).

Figure 2:
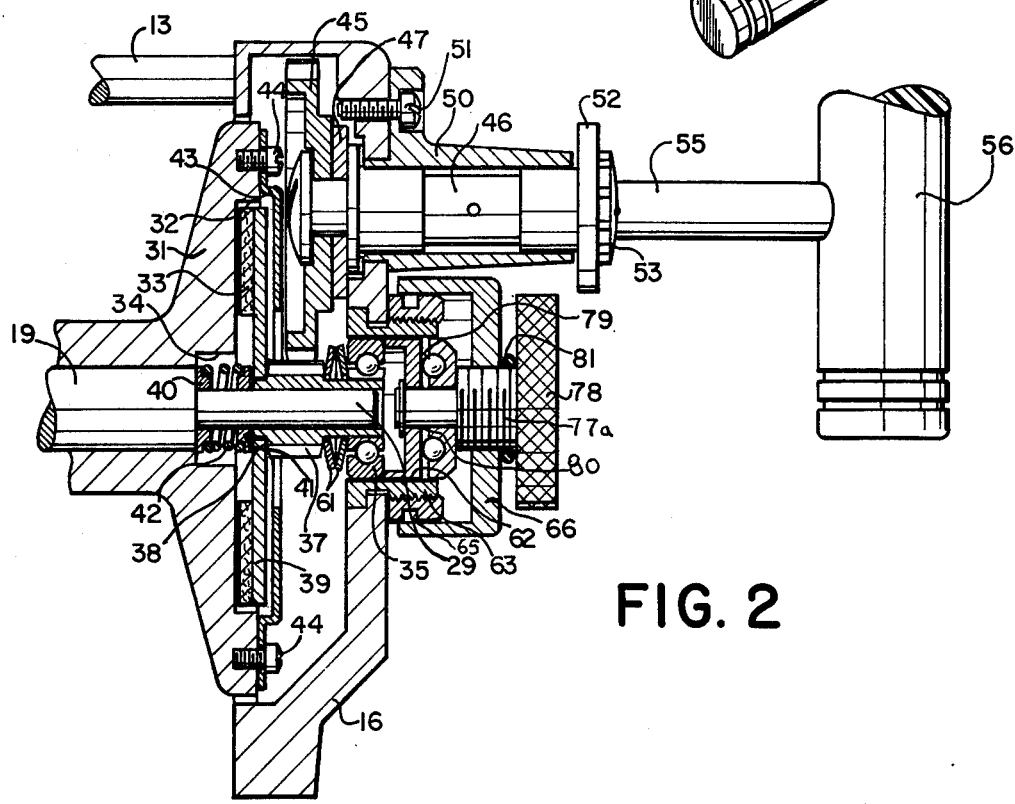
FIG. 2 is a vertical sectional view taken approximately on the line 2—2 of FIG. 1.
Figure 5:
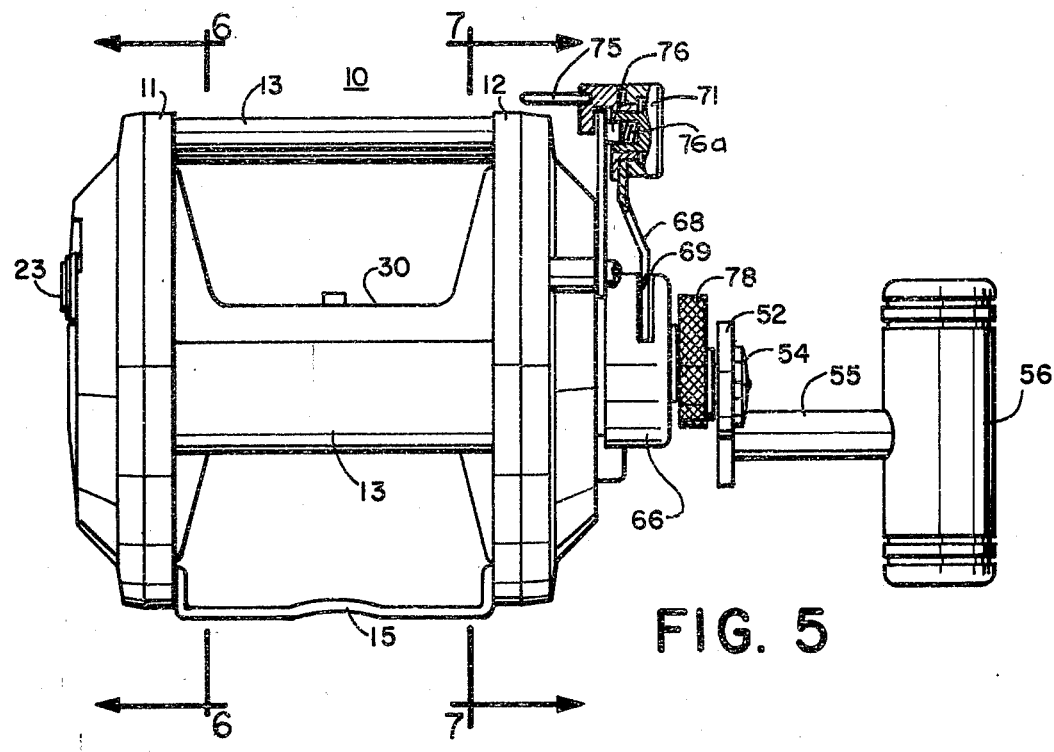
FIG. 5 is a top plan view of the structure of FIG. 1.

The spool 30 has an end head 31 with a recess 32 for the reception of a drag washer 33 of friction material carried therein. (See FIG. 2)

The spool 30 also has a central recess 34 through which an extension 29 of the shaft 19 extends. The shaft extension 29 is supported in a bearing 35 mounted in the housing plate 17.

The shaft extension 29 has a gear 37 slidably mounted thereon with a shoulder 38 for the reception of a pressure plate 39.

The pressure plate 39 and gear 37 have a spring guide washer 41 in engagement therewith, with an oppositely facing spring guide washer 40 engaging the shouldered end of the shaft 19. A compression spring 42 carried on the extension 29 bears on guide washers 40 and 41 and normally urges the gear 37 and the pressure plate 39 away from engagement of the plate 39 with the friction drag washer 33.

A circular cover plate 43 is provided for covering the recess 32 and is detachably connected to the spool end head 31 by screws 44.

Figure 7:
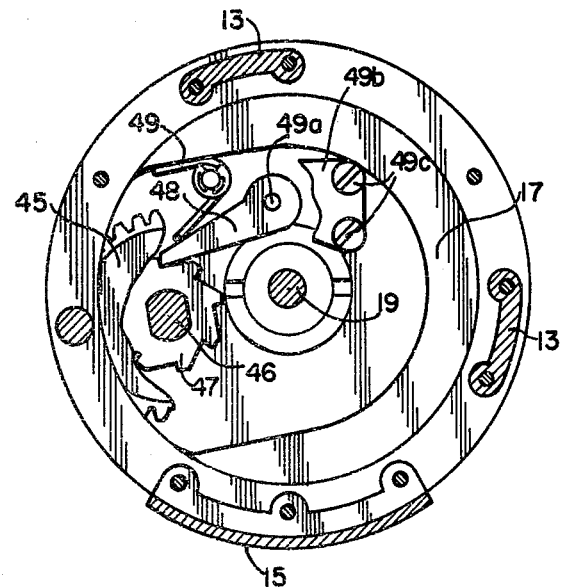
FIG. 7 is a vertical sectional view taken approximately on the line 7—7 of FIG. 5.
Figure 8:
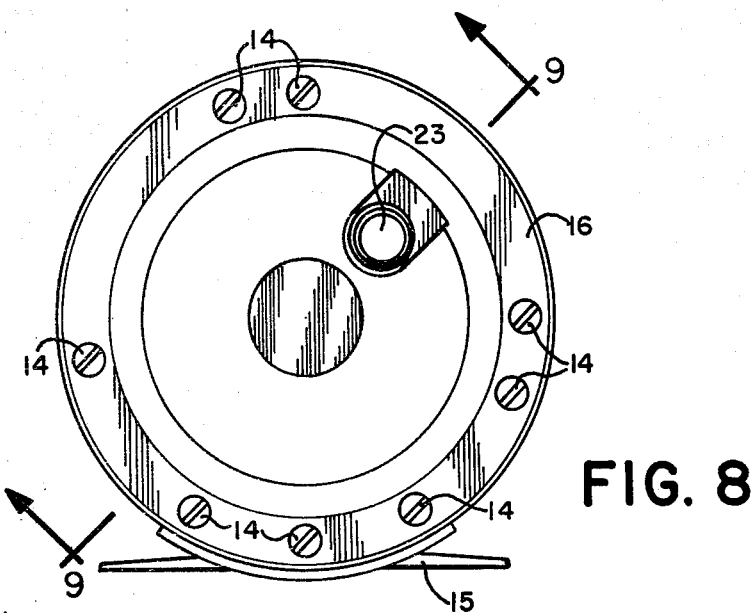
FIG. 8 is an end view of the reel of FIG. 1.

The gear 37 has a gear 45 on a stud shaft 46 in engagement therewith. The stud shaft 46 carries a ratchet gear 47 and a pivotally mounted dog 48 is normally held in engagement therewith by a spring 49 carried on the housing plate 17, thereby to limit movement of the gear 37 to one direction of rotation. (See FIG. 7). The dog 48 is mounted to the plate 17 by a shaft 49a, plate 49b and screws 49c.

The stud shaft 46 is carried in a hub 50 removably mounted on the housing plate 17 by screws 51 and has a radial arm 52 detachably secured to the shaft 46 by a stud 53. The head of the stud 53 can be held by a locking screw 54. (See FIG. 1). The arm 52 carries a crank rod 55 on which a manually operable knob 56 is pivotally supported. (See FIG. 1).

Conical spring washers 61 are interposed between the end face of the gear 37 and the inner race of the bearing 35. (See FIG. 2).

The outer race of the bearing 35 is in a bore 62 within an externally threaded extension 63 on the housing plate 17. The threaded extension 63 has a cam ring 64 threadably engaged therewith and formed with an outer cam 65 thereon. A cover 66 with projections 67 thereon is engaged with cam 65 and has a drag control lever 68 extending into a slot 69 in cover 66 and secured in place by screws 70. Openings 65a are provided in cam 65 to permit the cover 65 to be removed and detents 65b are provided in cam 65 to provide positive positions for free spooling and full braking to be described below.

The lever 68 has a guide head 71 with a slot 72 therein for movement along an arcuate guide strip 73 carried on the housing plate 17, one end of the strip 73 being adjacent the hub 50 and the other end being remote therefrom. The guide head 71 can be held onto the lever 68 by a stud 74 and has a position indicating finger 75. (See FIG. 3). A plunger 76 is carried in a bore 77 in head 71 and is urged into frictional contact with strip 73 by spring 76a. The cover 66 (See FIG. 3) also has in threaded engagement therewith the threaded stem 77a of an adjusting knob 78 which stem 77a carries a positioning collar 79 on its inner end, retained thereon by clip 80, for movement along the bore 62 and for engagement with the outer race of the bearing 35 for presetting the initial longitudinal position of the pressure plate 39 with respect to the drag washer 33. A friction ring 81 of resilient material may be mounted on the stem 77 between the knob 78 and the cover 66.

The mode of operation will now be pointed out.

The knob 78 is rotated to provide free spooling at the position remote from hub 50 with projections 67 in detents 65b and to provide braking when moved from that position.

In the free spooling position, the pressure plate 39 will be urged by the spring 42 out of engagement with the friction drag washer 33, so that no braking action will be applied.

If it is desired to apply a braking action to reduce the payout of line (not shown) from the spool 30, the guide head 71 is moved clockwise, as seen from the right of FIG. 1, to the desired extent to move the cover 66 and by such movement on cam 65 the positioning collar 79, the bearing 35, and the washers 61 apply a force against the gear 37 to urge the pressure plate 39 against the friction drag washer 33, as the spring 42 is compressed. The extent of braking will be determined by the positioning of the guide head 71, and if desired, complete locking action can be effected by movement of the guide head 71 toward hub 50.

In the brake applied position of the brake control lever 68, the knob 56 can be moved in a clockwise direction as seen in FIG. 1 to wind the line (not shown) onto the spool 30.

Quick and positive control of the spool operation is thus provided with the spool 30 free and maintained free when the guide head 71 is in the brake release position and with preset and variable brake application controlled by the brake control lever 68 as positioned by movement of the guide head 71.

If it is desired to service the friction disc 39 or other internal parts adjacent the end head 31 of spool 30, the cover 66 is rotated until the projections 67 line up with openings 65a in cam 65 and the cover 66, positioning collar 79, bearing 35 and washers 61 can be readily removed for service.

It will thus be seen that structure has been provided with which the objects of the invention are achieved.

I claim:

1. A fishing reel having spaced side housing members,
a spool interposed between said housing members,
a spool shaft journaled at one end in one of said housing members and to which said spool is secured,
said spool at its other end being journaled in said other housing member,
means for rotating said spool in one direction comprising
a hub mounted to said one of said housing members,
a stud shaft rotably carried by said hub,
a radial arm mounted to said stud shaft
a knob mounted to said radial arm for rotation thereof
a gear carried by said stud shaft
a spool gear movable along said spool shaft and driven by said stud shaft gear,
interengageable friction members one of which is on said spool and the other of which is movable with said spool gear, and
means for controlling operation of said spool,
said last mentioned means comprising
spring means for urging said interengageable members to out of engagement position for free spooling,
a brake control lever exteriorly disposed on said other housing member for manual manipulation, and
mounting members for said lever one of which is in cammed engagement with the other for applying a force in opposition to said spring means.

2. A fishing reel as defined in claim 1 in which
operating connections are provided between said lever and interengaging members, and
said spool gear provides a portion of said operating connections.

3. A fishing reel as defined in claim 1 in which
the other of said interengageable members is carried on said spool gear.

4. A fishing reel as defined in claim 1 in which
said mounting members include
a threaded extension extending from said one of said housing members,
a cam ring in threaded engagement with said extension, and
a cover in movable cammed engagement with said cam ring.

5. A fishing reel as defined in claim 1 in which
a presetting member is provided for adjusting the position of said interengageable members which comprises
a knob in threaded engagement with said cover.

6. A fishing reel as defined in claim 1 in which a cover plate is provided enclosing said interengageable members and detachably secured to an end of said spool.

7. A fishing reel as defined in claim 1 in which said one of said housing members has click mechanism thereon having a click tongue movable to active and inactive positions.

8. A fishing reel as defined in claim 4 in which said cam ring has a cam surface on the exterior thereof, and said cover has inwardly extending projections engaging said cam surface for axial movement of said cover upon rotation.

9. A fishing reel as defined in claim 1 in which said one of said mounting members is a fixedly mounted cam and said other of said members comprises at least one pin engaging said cam and positioned by said lever for applying a force on said spring means.

* * * * *